(12) United States Patent
Labriola, II

(10) Patent No.: US 7,723,942 B1
(45) Date of Patent: *May 25, 2010

(54) INTEGRATED MOTOR AND RESOLVER INCLUDING ABSOLUTE POSITION CAPABILITY

(75) Inventor: Donald P. Labriola, II, c/o QuickSilver Controls, Inc. 580 E. Arrow Hwy., Suite E, San Dimas, CA (US) 91773

(73) Assignees: QuickSilver Controls, Inc., Covina, CA (US); Donald P. Labriola, II, Covina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/368,221

(22) Filed: Feb. 9, 2009

Related U.S. Application Data

(62) Division of application No. 11/433,931, filed on May 15, 2006, now Pat. No. 7,508,154.

(51) Int. Cl.
*G05B 19/29* (2006.01)
(52) U.S. Cl. ........................ 318/601; 318/432
(58) Field of Classification Search ............. 318/601, 318/602, 432, 800, 798
See application file for complete search history.

(56) References Cited

U.S. PATENT DOCUMENTS

| | | | |
|---|---|---|---|
| 3,376,578 A | 4/1968 | Sawyer | |
| 3,509,390 A * | 4/1970 | Rachwal et al. | 310/15 |
| 3,735,231 A | 5/1973 | Sawyer | 310/13 |
| 3,857,078 A | 12/1974 | Sawyer | 318/608 |
| 3,970,979 A * | 7/1976 | Montagu | 335/229 |
| 4,025,810 A | 5/1977 | Field | |
| 4,687,961 A | 8/1987 | Horber | |
| 4,755,751 A | 7/1988 | Ray | |
| 4,772,815 A | 9/1988 | Harned et al. | |
| 4,823,062 A | 4/1989 | Hoffman et al. | |
| 4,870,358 A | 9/1989 | Glaize | |
| 4,873,462 A | 10/1989 | Harned | |
| 4,910,475 A | 3/1990 | Lin | |

(Continued)

FOREIGN PATENT DOCUMENTS

DE 4434577 4/1996

(Continued)

OTHER PUBLICATIONS

Lutz Göbel, et al., "A Small Linear Stepper Motor—Construction and Control," Intelligent Motion, pp. 621-626, May 1996.

(Continued)

*Primary Examiner*—Rina I Duda
(74) *Attorney, Agent, or Firm*—Orrick, Herrington & Sutcliffe LLP

(57) ABSTRACT

An integrated motor and position sensor achieves motion between a moving portion and a stationary portion by electrically energizing poles to interact with magnetics respectively on the moving and stationary portions. The position sensor includes a plurality of sensing coils placed to intercept the magnetic flux between a plurality of the poles and the magnetics. The outputs from these coils are fed to a microprocessor DSP through an internal or external A/D converter. The microprocessor or DSP decodes the measured voltages using resolver strategies to produce a position, velocity or acceleration measurement.

20 Claims, 7 Drawing Sheets

U.S. PATENT DOCUMENTS

| | | | |
|---|---|---|---|
| 4,980,594 | A | 12/1990 | Poro |
| 5,091,665 | A | 2/1992 | Kelly |
| 5,160,886 | A | 11/1992 | Carlen |
| 5,250,889 | A | 10/1993 | Ezuka |
| 5,434,504 | A | 7/1995 | Hollis et al. |
| 5,486,731 | A | 1/1996 | Masaki et al. |
| 5,742,136 | A | 4/1998 | Ono et al. |
| 5,763,976 | A | 6/1998 | Huard |
| 5,929,541 | A | 7/1999 | Naito |
| 6,091,170 | A | 7/2000 | Mayes |
| 6,137,204 | A | 10/2000 | Kuwahara |
| 6,175,169 | B1 | 1/2001 | Hollis, Jr. et al. |
| 6,225,715 | B1 | 5/2001 | Hoda et al. ............ 310/67 |
| 6,239,571 | B1 | 5/2001 | Shimahara |
| 6,414,909 | B1 | 7/2002 | Shimizu |
| 6,483,276 | B1 | 11/2002 | Shimizu |
| 6,777,843 | B2 | 8/2004 | Hayashi et al. ............ 310/67 |
| 7,538,460 | B2 * | 5/2009 | Labriola, II ............ 310/68 B |
| 2002/0117905 | A1 | 8/2002 | Toba ............ 310/12 |
| 2003/0055584 | A1 | 3/2003 | Raftari et al. ............ 702/58 |

FOREIGN PATENT DOCUMENTS

| | | |
|---|---|---|
| DE | 102004046824 | 4/2006 |
| EP | 1492217 | 12/2004 |

OTHER PUBLICATIONS

I. Boldea, et al., "Linear Electric Actuators and Generators," IEEE, pp. 11-15, 1997.

S. J. Bailey, "Incremental Servos for Digital System Compatibility," Control Engineering, pp. 48-52, Jan. 1975.

Dan Jones, "The Sensorimotor a New Motor Technology," Circle Reader Service No. 180, pp. 40-41, Feb. 1986.

Motion Control New Digest, "Windings Give Rotor Position Feedback in New BLDC Motors," pp. 15-16, Nov. 1987.

David L. Kruse, "High Performance BLDC/Stepper Motor Controller Doesn't Need Encoder," PCIM pp. 12-18, Feb. 1994.

Mechanical Engineering, "Get 'em While They're Hot," http://www.memagazine.org/backissues/auqust96/marketplace/new_products/, pp. 1-4, Aug. 1996.

Ralph Horber, "Sensorimotor: P.M. Synchronous Motor with Fully Integrated Position Sensor," Integrated Engineering Software, pp. 1-8, 1996.

* cited by examiner

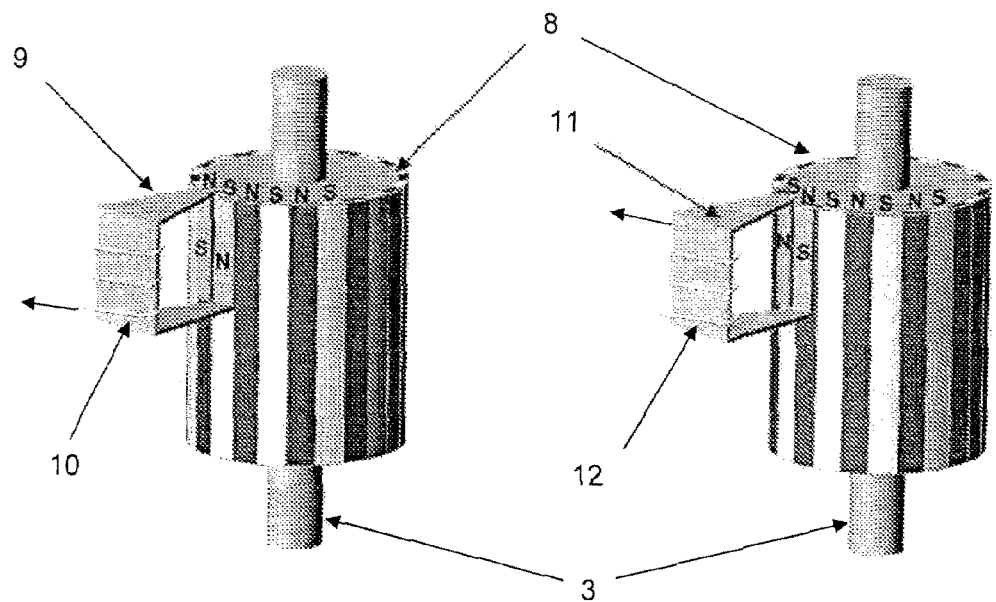
Figure 3A
Prior Art
Figure 3B
Prior Art
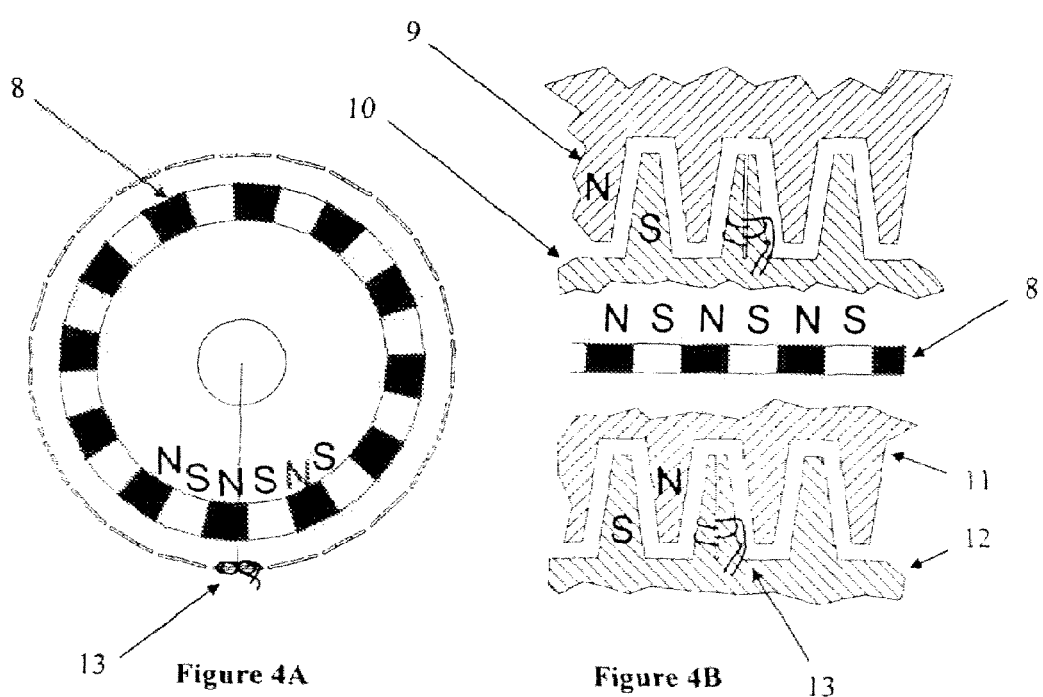
Figure 4A
Figure 4B

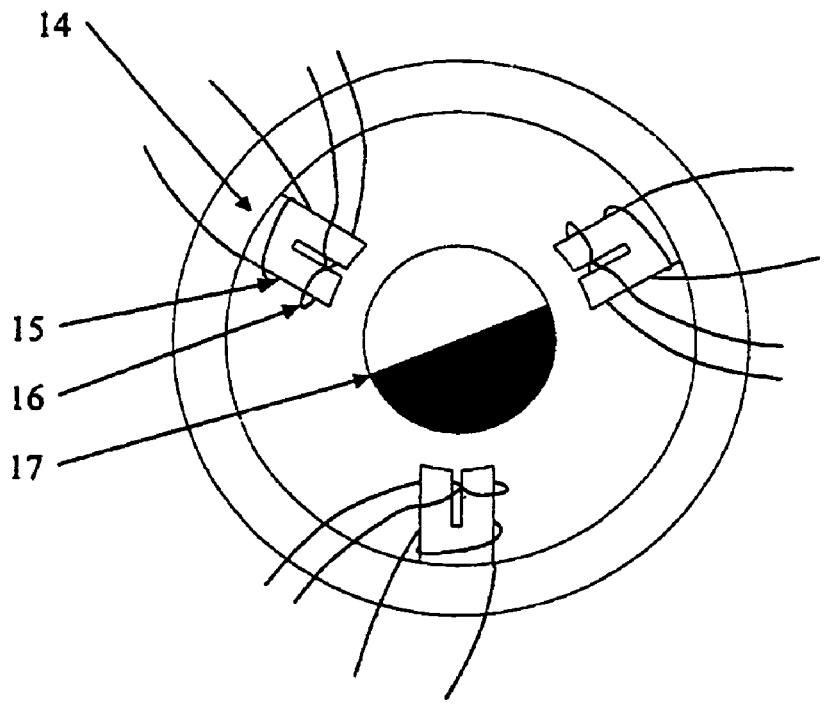
Figure 5
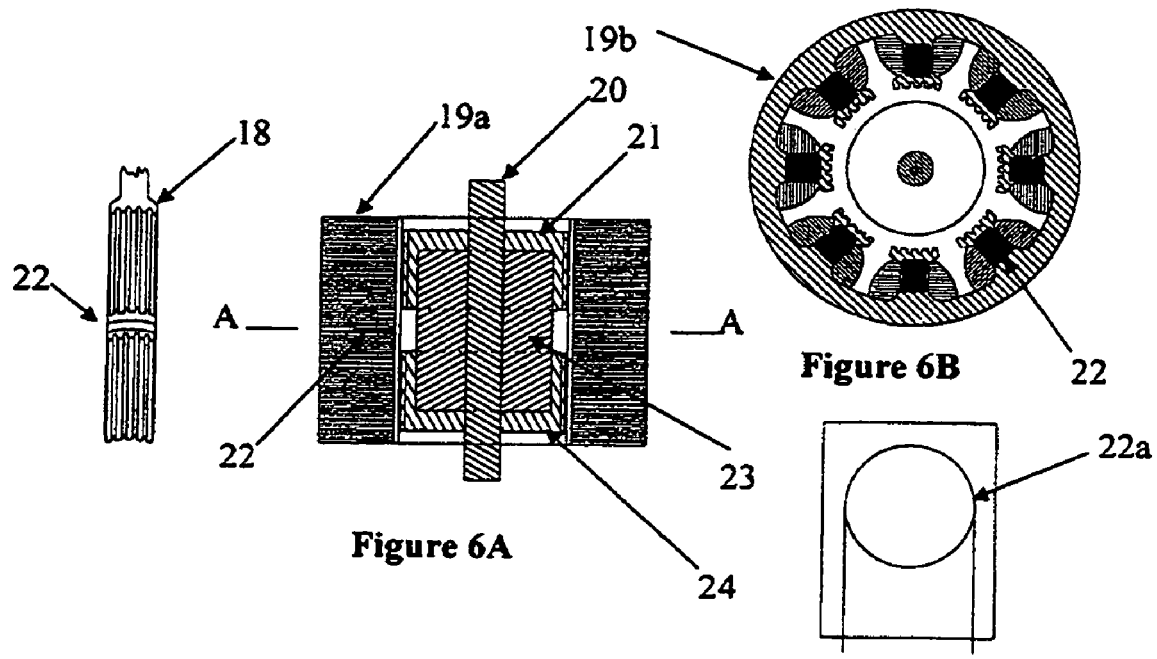
Figure 6A
Figure 6B
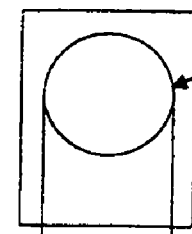
Figure 6C

Figure 7A  Figure 7B

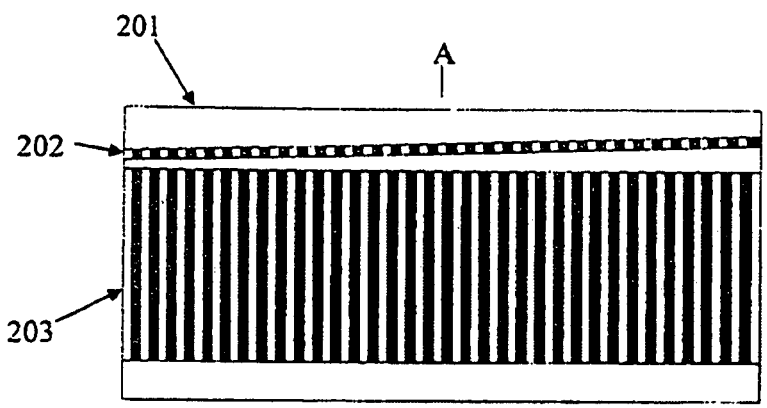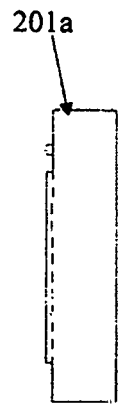
Figure 8A  Figure 8B
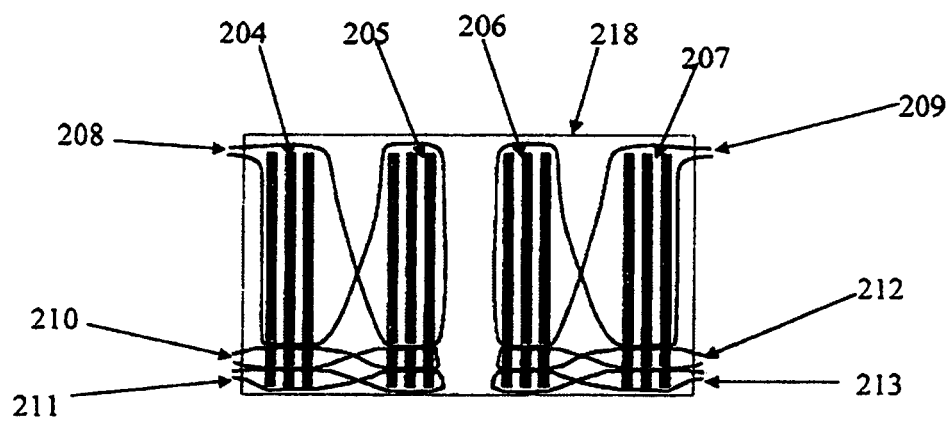
Figure 9
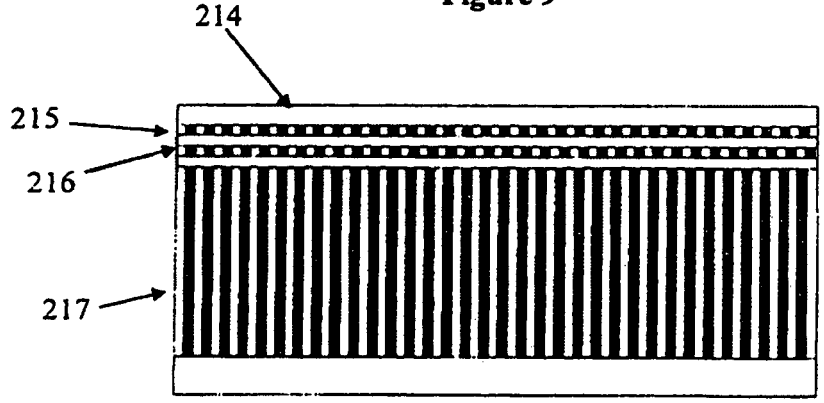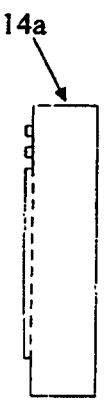
Figure 10A  Figure 10B

INTEGRATED MOTOR AND RESOLVER INCLUDING ABSOLUTE POSITION CAPABILITY

RELATED APPLICATION

This divisional application claims priority from U.S. patent application Ser. No. 11/433,931, Filed May 15, 2006, now U.S. Pat. No. 7,508,154 which application is incorporated by reference in its entirety.

BACKGROUND

1. Field of the Invention

This invention relates to a motor having a resolver for detecting a position, velocity or acceleration that is determined by the motor and, in a specific application, to such a motor associated with a control system that uses the position, velocity or acceleration in controlling the motor.

2. Description of the Related Art

Motors are used in a variety of applications for effecting the controlled motion of objects. For example, motors are used in a variety of industrial automation and other automation applications. In many applications, it is useful to provide the motor or the motor's controller with an accurate measure of the motor position to allow for greater precision in positioning objects with the motor. In other applications, it is useful to provide the motor or its controller with an accurate measure of the velocity or acceleration of the motor's rotor. Position, velocity and acceleration information can be useful however a motor is used, but one or more of these measures may be necessary when the motor is used in closed loop applications. In closed loop systems, one or more sensors collect position, velocity or acceleration information about a motor and provide that information to the motor controller. A closed-loop control system within the motor controller receives the motor position or other information as feedback and improves the accuracy of the positioning or movement characteristics of the motor. Motors whose operation is affected by feedback and under closed loop control are often referenced as servomotors.

To meet these needs, motors are often fitted with sensors that detect the position, velocity or acceleration of the motor. In most applications, only the motor position need be sensed as a function of time and other desired motor positioning characteristics can be derived from the relationship between the motor position and time. Two types of motor position sensors, encoders and resolvers, are prevalent in motors. Encoders provide the motor with an indicator of motor position and a detector that monitors changes in the positional relationship between the indicator and the detector. Indicators for encoders vary, but encoders generally rigidly mount the indicator with respect to the rotor or shaft of the motor so that the indicator changes positions as the rotor and shaft change position. Detectors generally are mounted in a fixed position, for example on the motor housing, and generally detect changes in the indicator position in a non-contact manner.

Encoder systems include those that use magnetic indicators and sensors and those that use capacitively coupled indicators and sensors. Presently prevalent systems use optical encoders to provide information about the change in motor position. Optical encoders typically affix a glass or other wheel to the motor rotor or shaft that has calibrated markings around the periphery of the wheel. The optical encoder further includes an optical sensor having a light source and a photodiode, with the light source and the photodiode positioned on opposite sides of the wheel so that rotation of the wheel causes the markings on the wheel to modulate the light path between the source and the photodiode. This modulation is detected and used to detect changes in the motor's position. Such an encoder can be used in the closed loop control of the motor and can be used to provide motor position information.

Encoders can provide accurate positioning and control information. On the other hand, encoders can be expensive in that an encoder can be a major portion of the cost of a motor. Encoders require alignment and additional wiring and can add significantly to the assembly costs of a motor. Encoders also typically have a reliable temperature range that is smaller than the temperature range of the motor to which they are attached, limiting the use of the motor to the smaller temperature range of the attached encoder. This can limit the power that can be practically achieved with the system due to the reduced temperature range. It would be desirable, for at least some motor applications, to provide a simpler or more cost effective strategy for measuring motor position or other motor characteristics.

Resolvers represent a different strategy for measuring the position and other movement characteristics of motors. Resolvers can be viewed as rotary transformers and generally have structures similar to motors. That is, resolvers include a rotating or otherwise moving rotor and a stationary stator. One or more coils are generally provided on the rotor and the stator, although other configurations are known. The resolver rotor is attached to a shaft and generally one or more of the windings of the stator or rotor are driven with an alternating signal. Signals from the undriven coils are extracted and processed to yield position or velocity information about the shaft to which the rotor is coupled. As a general matter, resolvers are added to motors as distinct structures and so are not integrated with the electronics or magnetics of the motor. When a resolver is implemented as an add on to an existing motor structure, it increases the cost of the components of the motor and also increases the assembly costs for the motor.

SUMMARY OF THE PREFERRED EMBODIMENTS

An aspect of the invention provides an integrated motor and position sensor comprising a motor comprising a rotor assembly including a cylindrical portion having an axis. The cylindrical portion of the rotor assembly has a plurality of peripherally-spaced and alternately magnetized regions. The motor further comprises a stator assembly coaxial with the rotor assembly and having a plurality of stator poles projecting toward the rotor assembly, arranged substantially coaxial with the rotor assembly. The motor also comprises coils for electrically energizing the stator poles. The integrated motor and position sensor in turn comprises a plurality of sensing coils placed to intercept the magnetic flux between a plurality of the stator poles and the rotor assembly.

Another aspect of the invention provides an integrated motor and position sensor comprising a motor comprising a rotor assembly and a stator assembly. The rotor assembly includes a cylindrical portion having an axis and having a plurality of peripherally arranged and alternately magnetized regions. The stator assembly is coaxial with the rotor assembly and has a plurality of stator poles projecting toward the rotor assembly. The motor further includes coils for electrically energizing the stator poles, wherein two or more pole pieces are divided essentially along a line of symmetry. The integrated motor and position sensor further comprises a plurality of sensing coils placed to intercept the magnetic flux between a plurality of the stator poles and the rotor assembly.

Another aspect of the present invention provides an integrated motor and position sensor comprising a motor comprising a rotor assembly including a cylindrical portion having an axis. The cylindrical portion of the rotor assembly has a plurality of alternately magnetized regions spaced peripherally around the cylindrical portion. The motor comprises a stator assembly coaxial with the rotor assembly and having a plurality of stator poles projecting toward and arranged coaxial with the rotor assembly. The motor further comprises coils for electrically energizing the stator poles. The integrated motor and position sensor further comprises a plurality of sensing coils placed to intercept, directly or indirectly, a portion of tangential magnetic flux between the stator and rotor.

Yet another aspect of the invention provides a motor comprising first and second pole pieces on a first part of a motor. The first and second pole pieces have respective sets of teeth spaced regularly on respective faces of the first and second pole pieces. The motor includes at least one motor coil to at least in part effect motor motion between the first part of a motor and a second part of the motor when the at least one motor coil is driven. The respective sets of teeth of the first and second pole pieces magnetically interact with corresponding sets of regularly spaced teeth on the second part of the motor when the at least one motor coil is driven. First and second sensing coils are coupled to the first and second pole pieces and arranged to detect changes in magnetic flux coupling between the teeth of the first pole piece and the second part of the motor, on the one hand, and between the teeth of the second pole piece and the second part of the motor, on the other hand. Third and fourth sensing coils are coupled to the first and second pole pieces and arranged to detect changes in magnetic flux coupling between the teeth of the first pole piece and the second part of the motor, on the one hand, and between the teeth of the second pole piece and the second part of the motor, on the other hand. The teeth on the first and second parts of the motor are arranged to produce a different variation period in the magnetic flux coupled through the third and fourth sensing coils than the magnetic flux coupled through the first and second sensing coils as a function of the relative positioning of the first part of the motor to the second part of the motor.

BRIEF DESCRIPTION OF THE DRAWINGS

Aspects of the present invention are illustrated in the attached drawings and can be better understood by reference to those drawings in conjunction with the detailed description. The attached drawings form a part of the disclosure.

FIGS. 3A and 3B schematically illustrate the windings and magnetics of a can-stack motor.

FIGS. 4A and 4B illustrate a can-stack motor according to the present invention and specifically illustrates the magnetics, the fingers and the sensing coils.

FIG. 5 schematically illustrates a low pole count motor according to preferred embodiments of the present invention.

FIGS. 6A-6C schematically illustrate a high pole count motor according to preferred embodiments of the present invention.

FIGS. 7A-7E schematically illustrate a linear motor according to preferred embodiments of the present invention.

FIGS. 8A and 8B schematically illustrate a linear motor according to preferred embodiments of the present invention.

FIG. 9 schematically illustrates a linear motor according to preferred embodiments of the present invention.

FIGS. 10A and 10B schematically illustrate a linear motor according to preferred embodiments of the present invention.

DETAILED DESCRIPTION OF THE PREFERRED EMBODIMENTS

Preferred embodiments of the present invention provide an integrated motor and position sensor. In such an embodiment, the motor achieves motion between a moving portion and a stationary portion by electrically energizing poles to interact with magnetics respectively on the moving and stationary portions. The position sensor includes a plurality of sensing coils placed to intercept variations, uneven distributions or imbalances from symmetry in the magnetic flux between a plurality of the poles and the magnetics or elsewhere within or adjacent the motor. The outputs from the sensing coils are fed to a microprocessor or DSP through an internal or external A/D converter. The microprocessor or DSP decodes the measured voltages using resolver strategies to produce a position, velocity or acceleration measurement.

Figure 1:
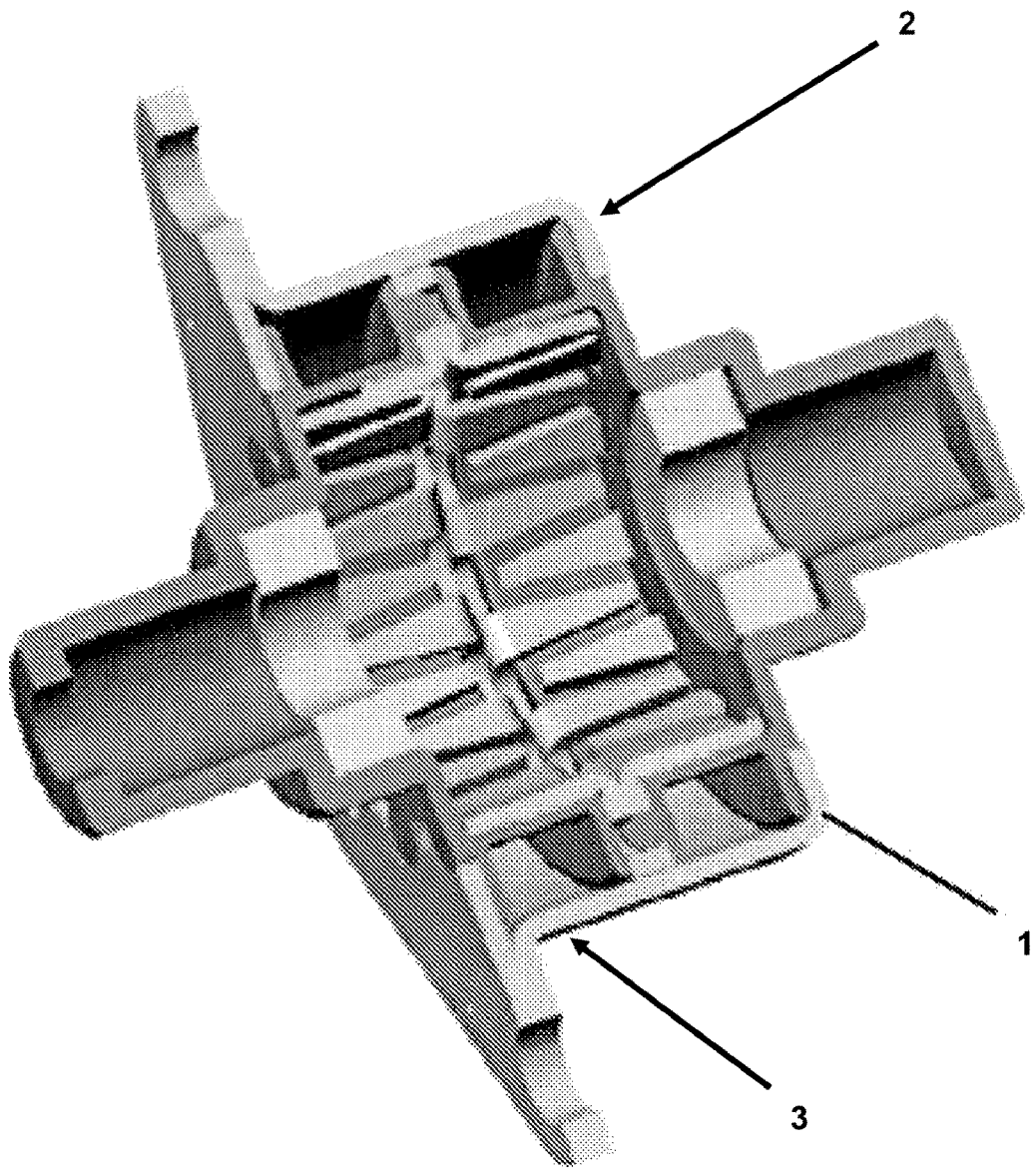
FIG. 1 schematically illustrates a can-stack motor in cross-section.
Figure 2:
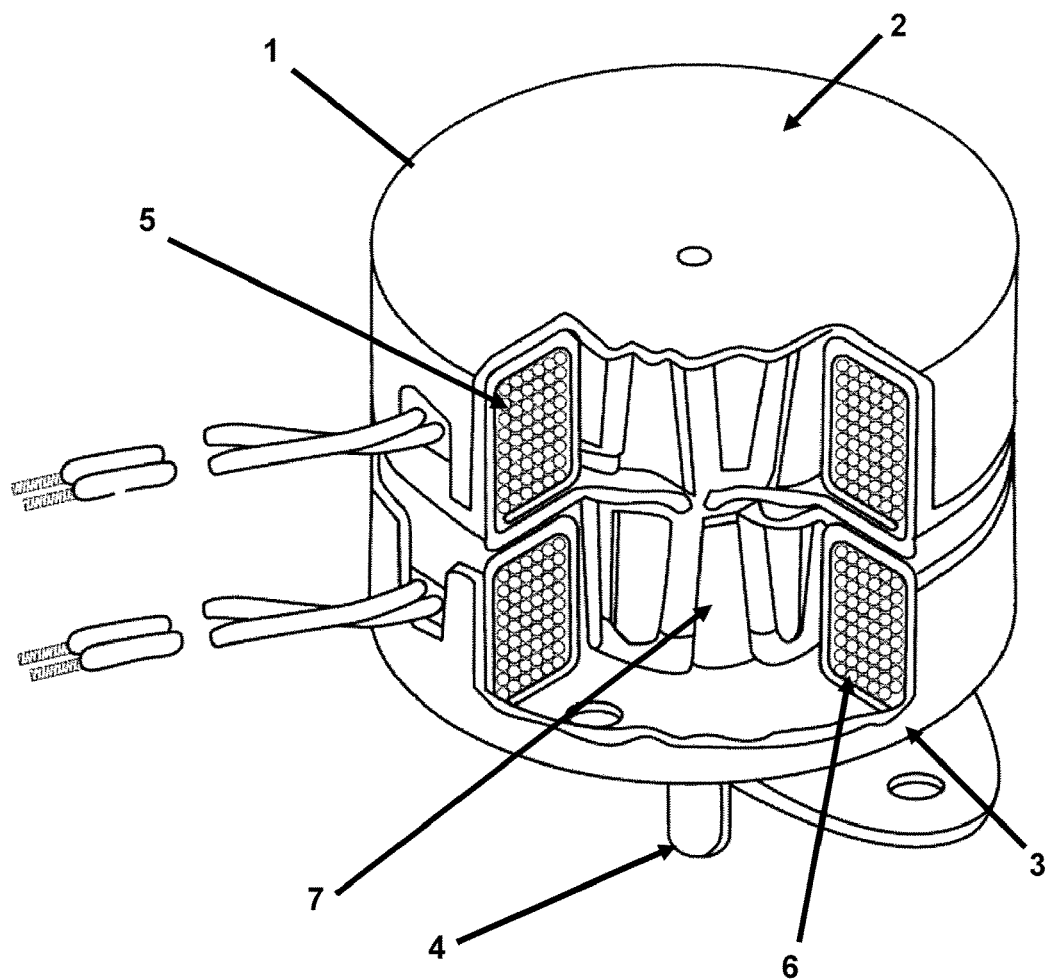
FIG. 2 schematically illustrates a can-stack motor in partial cut-away view.
Figure 7C:
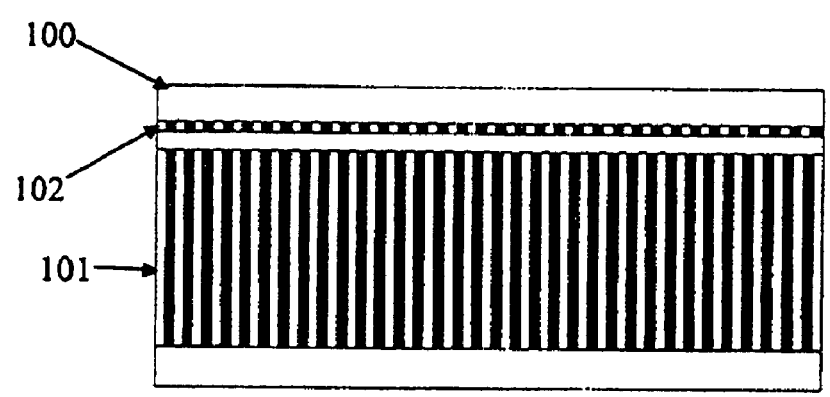
Figure 7C:
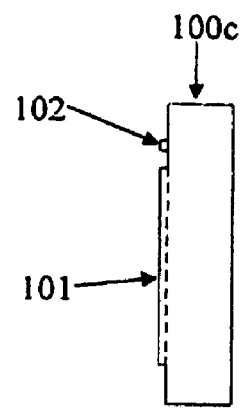
Figure 7C:
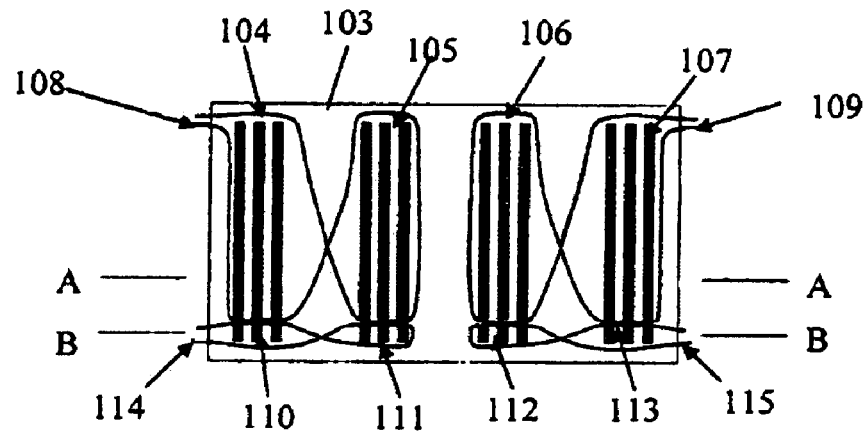
Figure 7D:
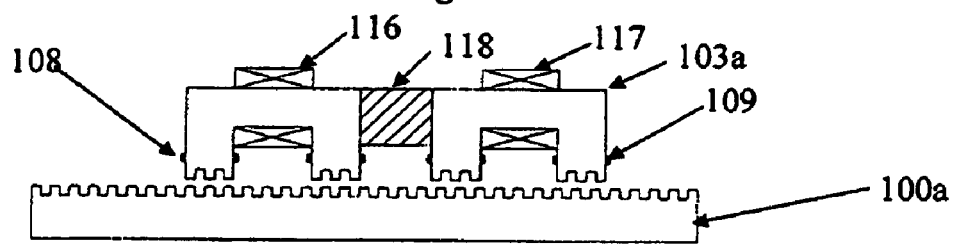
Figure 7E:
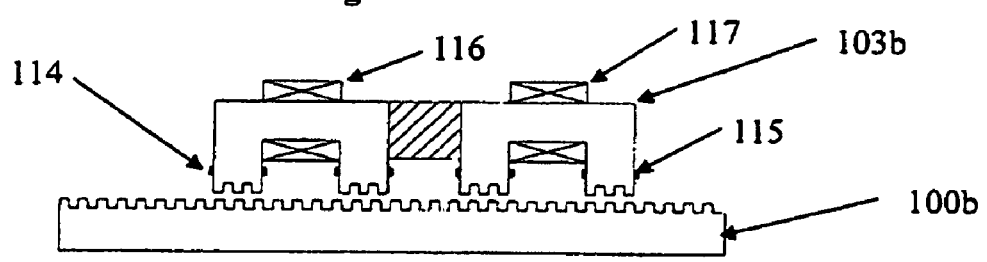

FIG. 1 and FIG. 2 are cut away views of a conventional can-stack motor 1. Can-stack motors are relatively inexpensive and are widely used. The upper stator stack 2 and the lower stator stack 3 are each magnetized by their own windings 5 and 6, respectively. The stator magnetic field is coupled to the rotor 8 by means of stator fingers 7. FIGS. 3A and 3B depict a simplified view of the magnetic circuits of the can-stack motor and of the stator interacting with the rotor magnets 8. Two magnetic circuits are depicted schematically side by side in FIGS. 3A and 3B showing a single finger pair 9 and 10 for the upper stator winding and a second single finger pair 11 and 12 for the lower stator, for simplicity. Practically, the motor is much more complex but this illustration effectively represents its operation. The upper and lower stators provide the two electrical phases for this typically two phase motor. The two finger sets are rotationally offset from each other by one-half of the pole spacing (one quarter of the electrical cycle spacing) so as to form a quadrature pair of coils; that is, they are phase shifted by ninety electrical degrees.

FIGS. 4A and 4B depict the same can-stack motor with added sensing coils. As illustrated, it is particularly preferred that the stator finger or, most preferably, stator fingers associated with the sensing coils are split to receive a preferred configuration of the sensing coils. The finger pairs in this drawing are shown in a flattened out view to simplify the perspective, whereas they are actually formed in a circular configuration around the rotor magnets 8 as shown in FIG. 4A. The rotor magnets 8 are only shown as a thin slice. The rotor magnets 8 actually extend beyond the fingers in both directions. Again, FIG. 4A only shows the relative pole spacing on the rotor and the stator for clarity. At least two sensing coils are used in this configuration. Most preferably, the FIG. 4 can stack motor uses a driver that provides a chopped driving signal to the stator windings.

Sensing coil 13 schematically indicates a "figure-8" coil to form a differential sensing coil. The sensing coil 13 may be more practically formed as two conventionally wound coils wired in series opposing relationship, or as two independent coils that are separately instrumented. In the preferred differential or series opposing configurations, the coils 13 measure the difference in the flux between the two halves of the split finger over which the differential or series opposing coils 13 are wound. If the finger is at a rotational position where the differential or series opposing coils 13 is centered over a pole, the flux in both finger halves should be symmetrical, resulting in no generated torque produced by that finger when the motor is energized. Likewise, the chopping action of the driver causes a variation in the flux produced by the stator winding. This variation in flux is also balanced, so no (or very little) signal is produced by the differential winding when the tooth is centered.

If the rotor is moved so that the same finger now is between poles, the flux will distribute in a non-symmetrical manner within the two finger halves. In this state, the variation in flux from the chopped motor driving signal will not divide evenly between the two halves of the finger, resulting in a signal from the differential sensing coil 13. The same effect will be present for each sensing coil, according to the positioning between the finger associated with the sensing coil and the nearest rotor pole. Due to the phase offset between the upper and lower stator fingers (pole structures), there is a phase offset in the recovered signals, allowing the position, velocity and acceleration each to be determined, as with a resolver. In this configuration, the split in the finger and the winding of the sensing coils provide sufficient flux separation to make meaningful measurements.

Although FIGS. 4A and 4B show a simplified construction, a multiplicity of fingers may be split, with additional windings used to average out rotor run-out and other tolerance-related inaccuracies. Further, although the sensing coils are depicted as physically located on the fingers, it may be advantageous to locate the coils in different configurations for manufacturing convenience while still sensing essentially the same variations in flux.

The resulting can-stack stepping motor may be operated in much the same manner as is described for the high pole count AC synchronous motor described in U.S. application Ser. No. 10/217,744, yielding the same benefits and obtaining the advantages listed in that application. Application Ser. No. 10/217,744 is hereby incorporated by reference in its entirety.

Another implementation of preferred aspects of this invention is to low pole count synchronous motors such as those schematically illustrated in FIG. 5. Again a slot may be added to the pole piece, through which is wound a sensing coil. This is implemented using a "figure-8" coil or, alternatively, two separate sense coils, preferably in a different configuration per phase. The "FIG. 8" method is schematically shown in FIG. 5. Alternatively, the transverse component of the flux (flowing from one pole half to the other) may be detected by inserting a flattened coil into the slit in the pole piece. Other variations for manufacturing ease may be adapted. Most preferably the resulting structures intercept an imbalance in the symmetry of flux distribution due to the tangential component of the pole flux when the rotor poles are not symmetrical to the stator pole. This tangential component is what operates the motor in that it generates rotor torque. As with the other configurations, the chopping action of a switched drive system provides a time variation of this field, allowing it to be more readily sensed with the pickup coil.

FIG. 5 depicts a two pole, three phase synchronous motor. The rotor 17 has a north-seeking pole (shaded) and a south-seeking pole (white). Each of the pole pieces 14 preferably has a drive winding 15 and a sensing winding 16. A pole piece, a drive winding and most preferably a sense coil are provided for each phase of the motor. The sensing winding (or coils) is configured to sense the flux imbalance between the two pole halves. The chopping action of the driver causes this imbalance to contain an AC component which is detected by the sense coil.

Low pole count synchronous motors such as those illustrated in FIG. 5 are commonly used as a "brushless" motor and use internal Hall effect devices for commutation. Often an encoder or resolver is provided to the FIG. 5 motor for position feedback. Both the commutation and motion detection functions can be replaced by the added sensing coils discussed here along with appropriate other circuitry for processing the signals from the sensing coils. This configuration preferably adds a slot to at least two and preferably three of the stator pole pieces. Sensing coils are placed to intercept portions of the magnetic flux generated by the coils which power the stator pole as the portion of the flux that passes through the different portions of the resulting pole pieces. The sensing coils associated with each phase may be differentially sensed, as presently preferred, or individually sensed and processed to produce information about the relative position of the rotor to the stator. Typically at least two of the stator poles having different phasing are sensed to produce unique position information. Other information about rotor motion with respect to the stator including velocity and acceleration can also be derived from these signals.

The differences in magnetic coupling between a given stator pole and the upper and lower rotor pole pieces gives rise to a component of flux within the body of the stator itself in the direction of the rotor axis. This internal component of the flux varies as a function of the difference of flux coupling between the upper and lower portions of the stator pole to the upper and lower rotor pole pieces. A sensing coil positioned between the laminates that make up the stator, with the coil opening positioned in the plane of the laminates between the upper and lower portions of the stator pole, would intercept and sense this "indirect" flux. The variation in this flux due to the chopping action produced in the windings by the winding driver circuitry produces a time varying component to this flux that in turn produces a signal that varies as a function of the relative rotary position of the rotor with respect to the stator. A plurality of such sensing coils provides the ability to determine the relative motion of the rotor with respect to the stator in the same manner as the direct flux sensing windings described in application Ser. No. 10/217,744, which is incorporated by reference in its entirety. Such a sensing coil arrangement may beneficially reduce manufacturing expense and complexity, especially if such a sensing coil were formed as a flexible printed circuit board or similarly encapsulated flat winding. The laminates in close proximity to the sensing coil may act as partial shorted turns as this same time varying flux component passes through them. It may thus be advantageous to place thin cuts in these laminates in the proximity to the sensing coils to maximize detected signal.

FIGS. 6A-6C illustrate an alternate indirect flux sensor construction. Stator pole piece 18 has the sensor winding 22 formed as a flat winding in the plane of the laminates. This sensor structure may be installed in a cut-out within one of the laminates, if needed for structural reasons, but preferably spans the entire plane of the laminate, allowing it to lay between standard laminates. While pole 18 shows a cut in the teeth in proximity to the sense winding, no such cut is required. The cutaway view is merely intended to show the placement of the sense winding within the stator pole. The stator of laminate 19b is a cross section of stator 19a through plane A-A. The rotor shaft 20 holds rotor magnet 23 between rotor pole caps 21 and 24. The sensing coil 22 is showed in an enlarged representation 22a. Sensing coil 22 senses flux traveling in the rotor axis direction through stator pole 18.

The position, velocity, and acceleration resolution of a resolver is typically dependant upon the angle able to be sensed within one electrical cycle of the resolver. The resolution of an encoder is often measured as a percentage of full scale (absolute) range. Increasing the pole count of the resolver provides finer resolution of motion measurement, but at a decreased range over which the information may be determined as an absolute position rather than a relative position. It is often advantageous to know the absolute position of the motor from power up without having to move the motor to an external switch or position limit, a process often referred to as "homing" a system. This presents a trade-off in system performance. Resolution within a cycle is limited by system noise and A/D converter resolution, as well as mechanical accuracy considerations such as runout and stator/rotor tooth shapes. Absolute sensing range is limited to one electrical cycle of the system. The use of a high pole count resolver provides high position resolution, but reduces the absolute position sensing range.

The range achieved by absolute position sensing methods is often extended by concatenating multiple sensors having different resolutions and absolute sensing ranges. This allows the high resolution of one sensor to be combined with the greater absolute position sensing range of a second sensor to provide high resolution over a greater sensing range. These multiple sensor methods are often full additional stages, requiring space and adding cost. Additionally, they should be aligned for consistent operation.

Multi-resolution resolver feedback may be incorporated into the integrated motor-resolver structures described in application Ser. No. 10/217,744, which is incorporated by reference, by adding rotor segments having a different number of teeth from the rotor used to provide motion. In a typical high pole count synchronous motor, for example a 1.8 degree stepper motor, which has 50 teeth on each pole piece for a total of 100 rotor poles, an additional rotor sensor segment may be added to sense absolute position. The preferred method and structure provide absolute position sensing by the addition of one or more rotor segments, isolated from the torque producing sections, most preferably by having a tooth count that differs from the torque producing pole pieces by one tooth. Two or more sensing coils are positioned to intercept a portion of the flux flowing from the stator to the teeth of the added rotor segment. Note that the sensing coils placed mechanically 180 degrees apart on the stator will produce signals 180 degrees out of phase for these odd tooth count segments, whereas the signals produced would be in-phase for even tooth count segments.

In the example case of a 100 pole motor, each motor pole piece has 50 teeth, and the extra absolute position segment may have 49 or 51 teeth. The secondary sensing coils placed adjacent to this added rotor sensor intercept a portion of the magnetic flux produced by the motor stator windings. The signals from these additional sensing coils vary approximately sinusoidally as each tooth passes next to a sensing coil. The primary sensing coils adjacent to the main rotor produce 50 sine and cosine variations per mechanical revolution, while the secondary sensing coils, in the case of the 49 tooth configuration, produce 49 sine and cosine variations per mechanical revolution. A trigonometric identity may be applied to combine the signals into a once per revolution absolute position.

Primary sensor signals, when decoded and scaled, approximate:

Primary1=Sin(50*Theta)

Primary2=Cos(50*Theta)

The secondary sensor signals, using the case of the 49 tooth rotor segment, when decoded and scaled, approximate:

Secondary1=Sin(49*Theta)

Seconarary2=Cos(49*Theta)

Using the sine of the difference and the cosine of the difference trigonometric identities:

Sin(A−B)=Sin(A)Cos(B)−Cos(A)Sin(B)

Cos(A−B)=Cos(A)Cos(B)+Sin(A)Sin(B)

The primary and secondary sensor signals may be combined:

Sin(50*Theta−49*Theta)=Sin(Theta)=Sin(50*Theta) *Cos(49*Theta)−Cos(50*Theta)*Sine49*Theta)

And:

Cos(50*Theta−49*Theta)=Cos(Theta)=Cos (50*Theta)*Cos(49*Theta)+Sin(50*Theta)*Sin (49*Theta)

An inverse tangent calculation may be used to find the rotor mechanical angle Theta. It is not intended by this example calculation to indicate that this is the only calculation that will yield absolute rotor position, but merely to demonstrate one example of how these primary and secondary signals may be combined. The resolution of the position information may be extended by using the once-per-revolution information to determine the rotor position to within one of the fifty electronic cycles of the primary sensor, while using the angle position information from the primary sensor to determine the position within that electrical cycle. This combination provides high accuracy absolute position feedback over a range on one mechanical revolution of the motor.

This same method of dual resolution position sensing to extend absolute positioning range may equally be applied to linear format motors, as described in application Ser. No. 10/217,744, which is incorporated by reference. In place of the added rotor segment of the absolute rotary position sensing, one or more additional tracks of platen teeth may be added, with the additional tracks having a spacing interval different from the primary track responsible for producing force. Changing the spacing interval only slightly for the added tracks produces a longer interval over which absolute positioning may be obtained, but produces small signal differences which may be difficult to decode to determine the correct electrical cycle. Larger changes in spacing between the main (driving track) and auxiliary sensing tracks makes decoding the appropriate electrical cycle easier, but limits the range over which the signals provide absolute position information. The determination of whether a single or multiple auxiliary tracks are needed depends upon the resolving accuracy of the hardware and electronics as well as the overall travel range of the platen. The auxiliary sensing tracks would normally have reduced widths as compared with the primary force track to reduce any force ripple introduced due to interaction with the forcer field. Additionally, the magnetic gap between the sensing magnetics on the forcer and the platen track may be increased to reduce interaction. Force ripple may further be reduced by using two auxiliary sensing tracks for each auxiliary resolution level. The teeth of the second track are shifted by one half-tooth pitch or 180 electrical degrees between tracks to produce an equal and opposite force ripple, canceling out the effect. In cases where dual auxiliary tracks are employed, the sensing coil advantageously may be modified to take advantage of the complimentary magnetic flux path to improve signal quality.

FIGS. 7A-7E illustrate a linear platen and forcer assembly. The platen assembly 100 preferably is formed from a magnetic material which is easily magnetized, but which only minimally retains any magnetization when the external field is removed. The drive track 101 of the platen magnetically interacts with the forcer 103 when forcer drive coils 116 and 117 are energized. Energizing the forcer drive coils in a cyclic manner, such as by using sine and cosine drive currents, produces a motion of the forcer with respect to the platen. The drive track 101 consists of alternating teeth which typically have been machined into the platen 100. Platen 100*c* is a side view of platen 100 showing the projection of these teeth. A sensor track 102 is shown running parallel to the drive track. The tooth pitch of the sensor track 102 is selected to be slightly different from the tooth pitch of the drive track 101. It is common to fill the space between the platen teeth with a non-magnetic material to protect the teeth, to reduce contamination and to reduce windage effects as the forcer passes over the platen teeth.

The forcer 103 is shown as shown from the "bottom" view. This face is kept in close proximity to the platen in operation. The drive magnetics section of the forcer 104, 105, 106, 107 couple the magnet fields produced by permanent magnet 188 and drive coils 116 and 117 to the platen through the teeth at 101. A portion of this magnetic field also flows through the forcer sense magnetics 110, 111, 112, 113. The sense magnetic field interacts with the platen at platen sense track 102. The flux through the various magnetic paths to the platen are intercepted by sense coils 108 and 109 as well as auxiliary sense coils 114 and 115. Although the coils are shown in a "figure-8" differential winding format, they may actually be composed of separate windings differentially connected or of independent windings independently processed. The difference in tooth pitch between the drive teeth 101 and the auxiliary sense teeth 102 produce respective signals having differing spatial periods. Additional auxiliary tracks may be added in a similar manner to produce additional spatial periods to extend the absolute position sensing range. Forcer 103*a* is a cross section at A-A of forcer 103. Forcer 103*b* is a cross section at B-B of forcer 103. The forcer sense magnetics 110, 111, 12, 113 are shown having the same spacing as the forcer drive magnetics 104, 105, 106, 107. While this configuration may yield the simplest manufacturing structure, auxiliary sense signals may in some implementations be improved by matching the spacing so as to correspond with the tooth placement of the platen sense track. Such an alignment of the teeth improves the quadrature spacing of the signals—that is it produces a phase shift closer to ninety electrical degrees—between the two auxiliary or secondary sensing coils. A known different phase shift may also be used and easily corrected mathematically by accounting for the offset.

The range over which absolute position may be determined may be extended either by aligning the sensor track 202 at a sloping angle on platen 201 with section A-A 201*a*, as shown in FIGS. 8A and 8B, or by adding dual resolution sensor tracks 215 and 216 as shown on platen 214 and its side view 214*a* of FIGS. 10A and 10B. The forcer drive magnetics 204, 205, 206, 207 and sense coils 208, 209 operate in the same manner already described. The auxiliary sense coils 210, 211, 212, 213 operate in two different modes, according to whether the sloped sensor track or the dual sensor track is utilized. If operated with the platen 201 utilizing the sloped auxiliary sensor track 202, the signals from auxiliary sense coils 210 and 211 are summed as are the signals from auxiliary sense coils 212 and 213 to form the secondary sense signals used to calculate the coarse position. The summing of the signals effectively cancels or removes the effects of the slope of the sensor track 202. These same signals are instead differenced to produce a very coarse signal, which is modulated by the sloping of the sensor track. It is understood that the signal summing and differencing may be done by combining the signals with the sense loops configured as shown, or by alternate sense coil winding configurations to produce the same net result.

The same forcer head 218 may also be used with platen 214 having two auxiliary sensor tracks 215 and 216. The tooth pitch of these auxiliary sensor tracks preferably differ from each other as well as from the main drive track. In this configuration, sense coils 210 and 212 produce signals at a first spatial resolution while sense coils 211 and 213 produce signals at a second spatial resolution. As depicted, the very coarse auxiliary sensor track, 215, has a tooth pitch that is only very slightly different from the main drive platen tooth spacing, optimally having somewhat less than one additional (or fewer) electrical cycles than the main drive over the entire length of the platen. The coarse auxiliary sensor track, 216, is depicted as having a slightly different tooth pitch than the main drive platen teeth, varying by a full tooth over some 50 teeth of the main platen. The actual spacing is dependent upon the ability of the system, both motor-resolver and electronics, to resolve the multiple signals robustly into absolute positions, which in part is dependent upon the longest length platen anticipated. The choice of one tooth advance in 50 is to demonstrate that the same or very similar processing may be used to extend the absolute resolution in both rotary and linear formats.

The integrated motor-resolver may be similarly applied to rod type linear motors, having either single resolution position sensing or dual resolution sensing, where in the plane of the platen motor is simply mapped about the circumference of a cylindrical shape or nearly cylindrical shape such as rectangular prism shape. In the case of a rectangular prism, the first resolution teeth corresponding to the first platen teeth are, for example, disposed along two opposing sides of the rectangle, spaced along the length of the rod, while the second platen teeth are disposed along the other two opposing sides, spaced at a different interval. For a single resolution, rod style, linear motor, the platen may be a circular cylinder or nearly circular cylinder, with the teeth about the circumference of the circle. It is appreciated that the rod may include other essentially cylindrical shapes, including "I" shapes and other structurally advantageous shapes, with the platen teeth similarly deployed.

The slightly non-circular configuration may include a keying shape so as to allow a second rotary motor to rotate the rod about its center axis while the forcer moves the rod about its linear axis, producing a two-degree-of-freedom actuator.

The dual axis linear forcer may have the two different resolution tracks coupled to the forcer coils via a rotatable flux coupling element so as to allow the flux from the forcer to be directed from the forcer poles, through the respective sensing coils to the appropriately spaced teeth along the rod-shaped platen. This allows the rod to be rotated while still supplying absolute position information along the length of the rod.

Such a dual axis linear forcer is readily combined with a rotary motor, and especially an integrated motor-resolver to provide a rotary-linear positioning system having absolute positioning capability.

The accuracy of the position information may further be improved by correcting systematic errors. The error information is measured using a known sensor and stored to electronic memory associated with the motor as a function of the uncorrected absolute position. At run time, the absolute position information is used to index into error mapping information, with the calculated (systematic) error cancelled from the uncorrected absolute position information. Alternatively, the mapping may be applied to the composite system, such as a motor connected to a mechanism, to compensate for errors in the attached system as well as the errors associated with the integrated motor-resolver. The indexing into the error mapping may be accomplished by, but is not limited to, table look-up, interpolation, and polynomial approximation, by either analog or digital methods.

Nothing here should be taken to preclude the inclusion of additional segments with different tooth combinations to further enhance the signal. For example, the absolute position sensing for the coarse Theta measurement may alternatively be attained using a once per revolution cam, or preferably a pair of them offset by 180 mechanical degrees to balance the mechanical dynamics, similar to a common resolver, but using the drive coils to produce the sensing magnetic field to simplify the required electronics. Again, the position resolution may be enhanced by combining the signals from the primary and secondary sensors.

The absolute position sensing may optionally be extended to multiple turns by means of a multiplicity of segments located coaxially to the already described rotor segments, while coupled to the primary shaft through a means, such as gearing, to produce one physical revolution of the multi-turn absolute position sensing segments for multiple turns of the primary shaft. The position of this geared down multi-turn sensing means is determined similarly as for the main position segments. Multiple stages may be added in a like fashion to further extend the number of revolutions sensed.

The absolute positioning methods described above may also be applied to linear motors. The absolute positioning range is extended beyond one electrical cycle of the motor by adding multiple teeth to the platen, having a tooth spacing varying from the main platen teeth so as to vary by one tooth over the range over which absolute position determination is desired. The same trigonometric equations are used to extract the position, with "Theta" scaled to indicate linear position rather than rotary angle. Position accuracy, as well as any derived velocity and acceleration measurements, may be improved using error correction tables or parameters.

In the case that the resolution of the absolute position sensing arrangement is not sufficient for the desired range, multiple tracks may be used, with each having differing periods to provide very coarse, coarse, and fine resolution position information. Alternatively, the location of the secondary track teeth with respect to the centerline of the main motor teeth may be varied, with multiple sensing coils arranged to detect the flux from the driving coils through the secondary track teeth. One set of sensing coils is arranged to sense the lateral distance and hence the very coarse position of the forcer with respect to the platen, while another set of coils is configured to sense only the tooth position relative to the platen in the direction of travel. The data from the multiple sensors is fused together with the very coarse information used to determine the position to within one coarse cycle, the coarse information used to determine the position within one fine cycle, and the fine position information to determine the position within that fine cycle.

Due to the combined magnetic paths of most motors, there is flux coupling between the different phases. A chopping signal on one of the phases may produce a detectable chopped flux signal on the sense windings of other phases. It is advantageous to vary the chopping transitions of the different drive phases so as to only have a single phase winding transition state at any given instant. This simplifies the correlation of resulting sense winding signals with the related chopper drive signals, as there are not simultaneous multiple transitions.

A preferred method of controlling the chopper drive as well as processing the resulting signals is the use of a digital signal processor (DSP). Commonly available DSP's, for example many members of the Texas Instrument TMS320 family, include digitally controlled pulse width modulators as well as one or more analog to digital converters (ADC's) which may be configured to acquire data based on timing events. However, these same functions may be performed by multiple devices, in either analog or digital format, using various processing blocks including analog and digital signal processors and a variety of programmable logic, or a combination of the same. Nothing here precludes the use these well known alternatives.

It is also well known that the integration of the electronics in proximity to the related mechanism may be advantageous in some applications. The mosolver-integrated motor-and-resolver-technique may be advantageously applied in both integrated and non-integrated configurations. Integrated configurations trade the heating of the electronics by the motor for simpler wiring, while non-integrated configurations allow wider motor temperature ranges, as well as the practical use of varying motor sizes. In the case of placing the electronics in close proximity to the motor, it is obvious that electronics may be mounted near to the motor housing as well as inside the motor housing itself.

The integrated motor-resolver sensing method preferably drives the motor with a chopper drive to provide an AC component in the stator flux so as to provide position information at all speeds including zero (stationary). The position sensing signals preferably are analyzed with respect to the chopper driver timing. This analysis is commonly performed on the same processor (DSP) as is used to control the chopper drive, which simplifies communication of timing information. On the other hand, nothing here is intended to preclude the analysis and control being implemented in separate hardware, whether processor, programmable logic, programmable analog function blocks, discrete logic/analog, or other means.

Many motor types have magnetic coupling between the phases. This includes many two phase and three phase motors. The detector winding signals produce components that correlate with the chopping signals of multiple phases. The associated controller may use this advantageously by accounting for the signal and processing it. To simplify the calculations, it is preferable to have only one winding transition at a time. The processor controlling the motor phase chopping signals is capable of adjusting the start and stop times so as to produce the same desired on time while providing time separation between the transitions of any of the winding drivers. The timing separation also allows a single multiplexed ADC to acquire multiple data points about each of the transition points focusing on one transition at a time, which may be advantageous to minimize hardware requirements.

Depending on the physical placement of the decoding circuitry with respect to the sensing coils, it may be advantageous to place amplifiers between the coils and a substantial portion of the cabling. The amplifiers would not be needed if the decoding circuitry, or indeed all of the driving and/or controlling electronics were to be incorporated near the motor or even at the back or side of the motor, or even within the motor enclosure itself. The elimination of an encoder and its temperature and dust sensitivity, as well as the inherent need to align and position the various elements of the encoder, would produce a smaller and more robust system, both in stand alone and integrated configurations. Because many motion centric digital signal processors (DSP's) include multiple ADC channels which may be triggered based on timing events, for example the TMS320LF24xx and TMS320LF28xx series (as well as many others), the size of such a closed loop control system could be significantly reduced by the elimination of the encoder, the encoder disk and the extra interconnects to the encoder. When compared to a resolver based system, the elimination of additional driven coils with the need for magnetic isolation from the motor windings, as well as the elimination of the added drive electronics to power the resolver coils and further the need to align the resolver to the motor produce significant size and cost benefits. Further, the control systems for the motion control system may incorporate basic PID, very well known in the art, as well as more recent control techniques including active damping, observer, fuzzy logic, and Kalman filtering, to name but a few.

Figure 11:
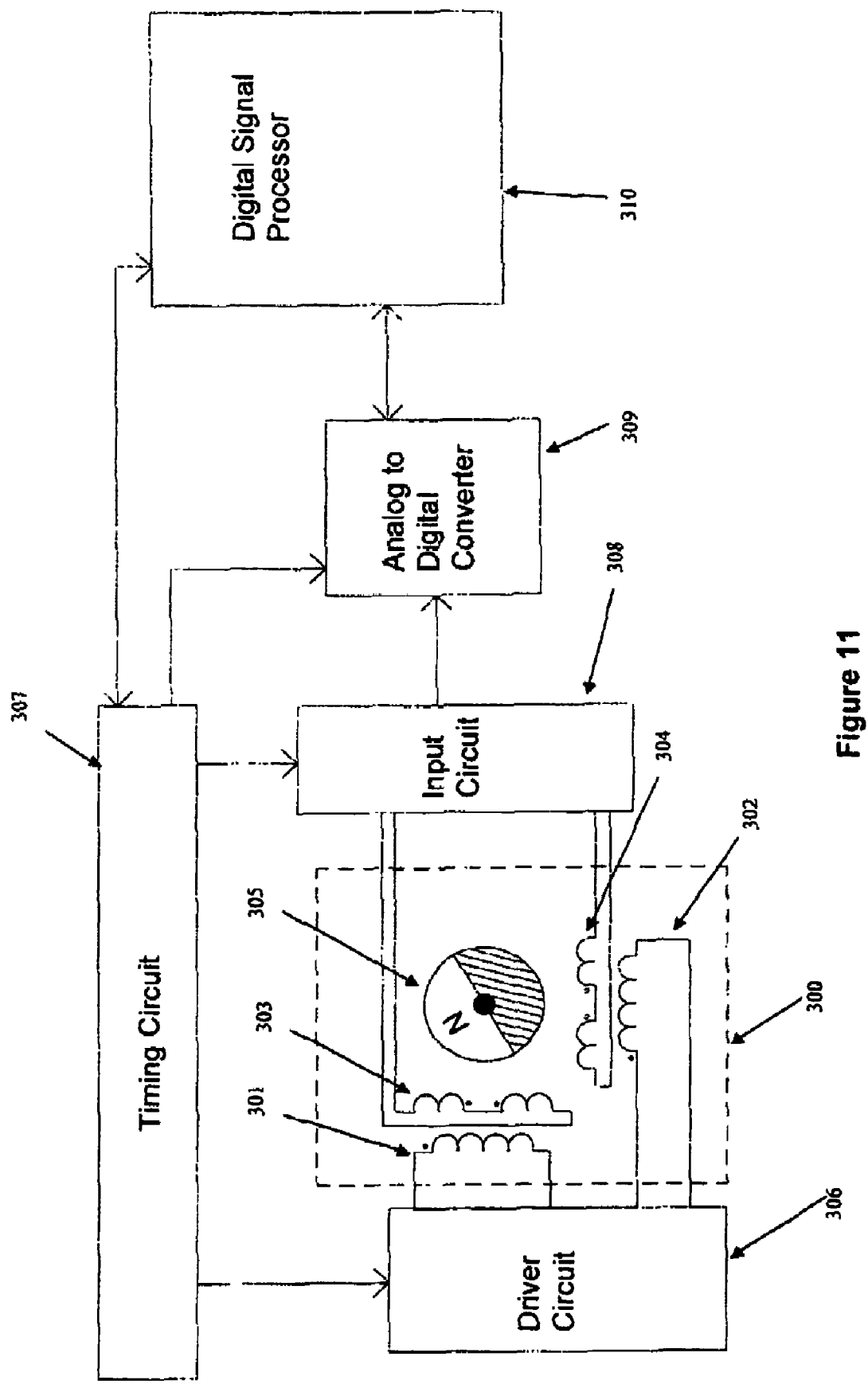
FIG. 11 schematically illustrates an integrated motor and position sensor with the control and sensing electronics associated with the motor and position sensor.

FIG. 11 schematically illustrates an integrated motor and position sensor 300 including drive coils 301 and 302, sense coils 302 and 303 and rotor 305. Driver circuit 306 provides pulse width modulated (PWM) drive signals to the drive coils 301 and 302. Timing circuit 307 provides timing signals to the driver circuit 306, as well as to the analog to digital converter 309 and the digital signal processor 310. The timing circuit 307 optionally provides timing signals to the input circuitry. The sense coils 303 and 304 provide position modulated signals to the input circuit. The input circuit may consist simply of line termination and input protection for the analog to digital converter 309, or may also include filtering, amplification or sample and hold functions, according to the input requirements of the selected analog to digital converter 309. The digital signal processor (DSP) 310 configures the timing circuit 307 as well as the analog to digital converter. DSP 310 derives the desired driving waveform for the integrated motor and position sensor 300, conveying the driving parameters to timing circuit 307. DSP 310 further derives the desired sampling times for the analog to digital converter, also conveying this information to the timing circuit. The DSP 310 receives the converted sensor signals from the sense coils 303, 304, conditioned by the input circuit 308 via analog to digital converter 309. The DSP 310 calculates the motor position using the converted sensor signals; the DSP 310 may optionally use state information previously derived to improve the accuracy of the position estimation, as well as to derive velocity and acceleration information.

The timing circuit 307, the input circuit, the analog to digital converter 309, the DSP 310 and the driver circuit 306, as well as other circuitry associated with the DSP, such as power supply and communications functions, may be integrated into one or more physical integrated circuits or combinations of discrete and integrated circuits. In addition, the digital signal processing may be implemented using conventional DSP implementations, such as with the Texas Instruments TMS320 family, or using distributed logic implementations as may be implemented using, for example, gate arrays or field programmable gate arrays. Some or all of the signal processing may alternatively be performed using analog functions. These alternatives are well known as applied to resolver to digital converters. Although for simplicity the implementation described shows a two phase integrated motor and position sensor having two differential sensing coils, the general approach may be extended to integrated motor and position sensors having a varying numbers of phases and having varying numbers of sensing coils.

The present invention has been described in terms of certain preferred embodiments thereof. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow:

I claim:

1. An integrated motor and position sensor comprising:
 a motor comprising a rotor assembly including a cylindrical portion having an axis, the cylindrical portion having a plurality of peripherally-spaced and alternately magnetized regions, a stator assembly coaxial with the rotor assembly and having a plurality of projecting stator poles projecting toward the rotor assembly, arranged substantially coaxial with the rotor assembly, and energizing coils for electrically energizing the stator poles to produce driving magnetic flux to alter a relative position between the rotor assembly and the stator assembly; and
 a plurality of sensing coils placed to intercept magnetic flux between a plurality of the stator poles and the rotor assembly, wherein
 at least one magnetic stator pole is distributed among multiple adjacent physical stator pole pieces with the energizing coils producing magnetic flux that is in phase through each of the associated physical stator pole pieces,
 at least one set of the sensing coils is positioned to differentially sense at least a portion of the magnetic flux from a plurality of the stator pole pieces associated with at least one magnetic stator pole, and
 the sensing coils responsive to variations in both the driving magnetic flux and to the relative position of the rotor assembly with respect to the stator assembly.

2. The motor and sensor of claim 1, further comprising sensing electronics for processing signals from the sensing coils and electronics controlling current through the stator poles integrated with the sensing electronics.

3. The motor and sensor of claim 1, wherein waveforms driving the energizing coils are coordinated to prevent essentially simultaneous transitions of the waveforms.

4. The motor and sensor of claim 1, wherein at least a portion of the rotor assembly is interior to the stator assembly.

5. The motor and sensor of claim 1, wherein at least a portion of the rotor assembly is exterior to the stator assembly.

6. The motor and sensor of claim 1, wherein at least a plurality of rotor poles and a plurality of stator poles are arranged on essentially parallel faces of the rotor assembly and the stator assembly.

7. The motor and sensor of claim 1, wherein the rotor assembly is held stationary and an electrically energized stator assembly is allowed to move.

8. An integrated motor and position sensor comprising:
 a motor comprising a rotor assembly including a cylindrical portion having an axis, the cylindrical portion having a plurality of peripherally arranged and alternately magnetized regions, a stator assembly coaxial with the rotor assembly and having a plurality of stator poles projecting toward the rotor assembly, and coils for electrically energizing the stator poles to produce driving magnetic flux to produce a change in a relative position between the rotor assembly and the stator assembly, wherein two or more stator pole pieces are divided essentially along a line of symmetry, and
 a plurality of sensing coils positioned to independently sense the flux from a plurality of the stator pole pieces associated with at least one magnetic stator pole, wherein at least one magnetic stator pole is distributed among multiple adjacent physical stator pole pieces with the energizing coils producing magnetic flux that is in phase through each of the associated physical stator pole pieces, and the sensing coils responsive to variations in both the driving magnetic flux and to the relative position of the rotor assembly with respect to the stator assembly.

9. The motor and sensor of claim 8, wherein waveforms driving the coils for electrically energizing are coordinated to prevent essentially simultaneous transitions of the waveforms.

10. The motor and sensor of claim 8, wherein at least a portion of the rotor assembly is interior to the stator assembly.

11. The motor and sensor of claim 8, wherein at least a portion of the rotor assembly is exterior to the stator assembly.

12. The motor and sensor of claim 8, wherein at least a plurality of rotor poles and a plurality of stator poles are arranged on essentially parallel faces of the rotor assembly and the stator assembly.

13. The motor and sensor of claim 8, wherein the rotor assembly is held stationary and an electrically energized stator assembly is allowed to move.

14. An integrated motor and position sensor comprising:
a motor comprising a rotor assembly including a cylindrical portion having an axis, the cylindrical portion having a plurality of peripherally-spaced and alternately magnetized regions, a stator assembly coaxial with the rotor assembly and having a plurality of stator poles projecting toward and arranged coaxial with the rotor assembly, and coils for electrically energizing the stator poles to produce driving magnetic flux and to cause relative motion between the rotor assembly and the stator assembly, and a plurality of sensing coils placed to intercept, at least a portion of magnetic flux produced from an energized stator pole passing through the rotor assembly and returning through pole pieces adjacent to a driven stator pole, wherein the plurality of sensing coils responsive to variations in both the driving magnetic flux and to a relative position of the rotor assembly with respect to the stator assembly.

15. The motor and sensor of claim 14, wherein waveforms driving the coils for electrically energizing are coordinated to prevent essentially simultaneous transitions of the waveforms.

16. The motor and sensor of claim 14, wherein at least a portion of the rotor assembly is exterior to the stator assembly.

17. The motor and sensor of claim 14, wherein at least a plurality of rotor poles and a plurality of stator poles are arranged on essentially parallel faces of the rotor assembly and the stator assembly.

18. The motor and sensor of claim 14, wherein the rotor assembly is held stationary and an electrically energized stator assembly is allowed to move.

19. The motor and sensor of claim 14, wherein outputs from at least two of the sensing coils are available independently.

20. The motor and sensor of claim 14, wherein at least two of the sensing coils are connected differentially.

* * * * *